United States Patent
Bartley et al.

(10) Patent No.: US 7,707,379 B2
(45) Date of Patent: Apr. 27, 2010

(54) DYNAMIC LATENCY MAP FOR MEMORY OPTIMIZATION

(75) Inventors: Gerald K. Bartley, Rochester, MN (US); John M. Borkenhagen, Rochester, MN (US); Philip R. Germann, Oronoco, MN (US); William P. Hovis, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 518 days.

(21) Appl. No.: 11/621,182

(22) Filed: Jan. 9, 2007

(65) Prior Publication Data

US 2008/0016308 A1  Jan. 17, 2008

Related U.S. Application Data

(63) Continuation-in-part of application No. 11/457,234, filed on Jul. 13, 2006, now Pat. No. 7,496,711.

(51) Int. Cl.
*G06F 12/00* (2006.01)

(52) U.S. Cl. .................. 711/167; 711/100; 711/154; 711/206

(58) Field of Classification Search ............ 711/100, 711/113, 117, 154, 159, 167, 206
See application file for complete search history.

(56) References Cited

U.S. PATENT DOCUMENTS

| | | | |
|---|---|---|---|
| 5,592,622 A | 1/1997 | Isfeld et al. | |
| 5,617,537 A | 4/1997 | Yamada et al. | |
| 7,111,088 B2 * | 9/2006 | Kawasaki et al. | 710/38 |
| 2005/0185463 A1 | 8/2005 | Kanamori et al. | |
| 2006/0230223 A1 | 10/2006 | Kruger et al. | |

* cited by examiner

*Primary Examiner*—Jasmine Song
(74) *Attorney, Agent, or Firm*—Bockhop & Associates LLC

(57) ABSTRACT

In a method of controlling computer-readable memory that includes a plurality of memory locations, a usage frequency of a plurality of data units is determined. Upon each occurrence of a predefined event, a memory latency for each of the plurality of memory locations is determined. After the predefined event, a data unit with a high usage frequency is stored in a memory location with a low latency.

18 Claims, 3 Drawing Sheets

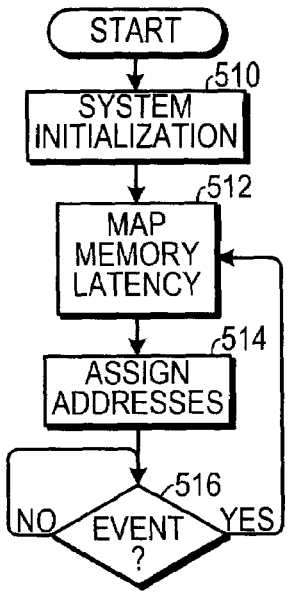
FIG. 5
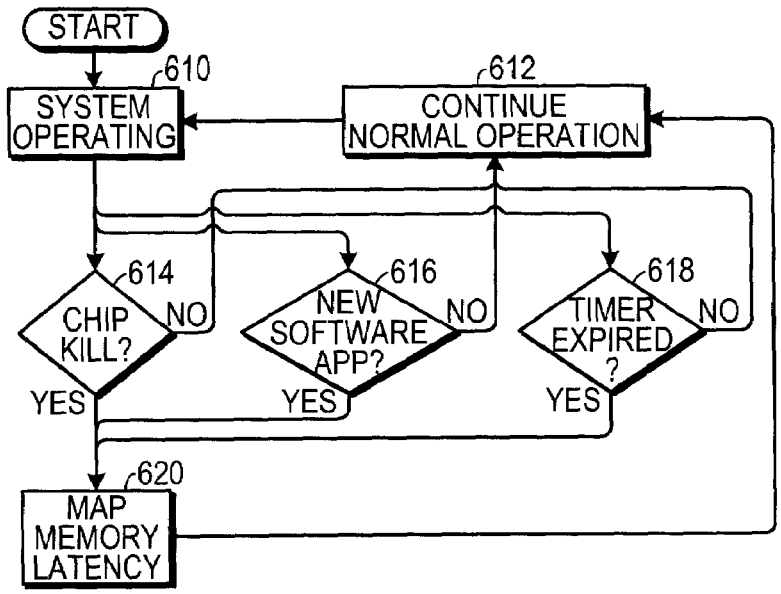
FIG. 6
FIG. 7

DYNAMIC LATENCY MAP FOR MEMORY OPTIMIZATION

CROSS-REFERENCE TO RELATED APPLICATION(S)

This application is a continuation-in-part of, and claims the benefit of, U.S. patent application Ser. No. 11/457,234, filed Jul. 13, 2006, now U.S. Pat. No. 7,496,711 the entirety of which is hereby incorporated herein by reference.

BACKGROUND OF THE INVENTION

1. Field of the Invention

The present invention relates to computer memory management and, more specifically, to a computer architecture that stores data units based on known memory location latencies.

2. Description of the Prior Art

Virtually all computer circuits employ some sort of digital memory to store data. Such memory can include a combination of different types of memory devices, including one or more of the following: on-chip memory (such as array of registers), on board memory (such as cache memory), main memory (such as DRAM memory chips on a different circuit board from a processor), flash memory (such as memory device that can be plugged into a special reader or a USB port), and disk memory (such as a hard drive).

Some data units (which can include any method of grouping data) residing in a memory space are less-used than other data units stored on the same memory space. However, different parts of a computer's memory space exhibit different memory latencies (the amount of time it takes for data to be transferred from a memory location to the entity that requested it). For example, memory chips closest to a memory buffer are likely to have a lower latency than memory chips farther away from the memory buffer.

Most memory devices can be classified in terms of relative speed. For example, on-chip memory is usually faster that on-board memory, and both are usually much faster than disk memory. However, sometimes certain portions of a relatively slower memory device may actually have a lower latency than portions of a relatively faster memory device. Therefore, placing frequently used data units in a slower portion of the faster memory device instead of the faster portion of the slower memory device would result in an inefficient usage of memory space.

In many memory applications, dynamic random access memory (DRAM) chips are placed at similar rank positions in an array, thereby creating a flat memory structure in which all of the memory is accessible for data writes and reads equally from the memory controller. However, in current industry-standard schemes, such as fully buffered dual in-line memory module (FBDIMM), there is a non-uniform access time to each layer of memory through buffers on the memory chips. Memory controllers supporting the current FBDIMM standard can take advantage of lower latencies for closer DIMM chips, but do not deliberately map heavily utilized data closer to the memory controller, or less heavily utilized data farther away from the controller.

Current memory devices include caches (for processors), which typically place data into sorted levels (L1/L2/L3), but that require space for a copy (or placeholder) of the original data be maintained either in main memory or in a direct access storage device (DASD) such as a hard drive. This is an inefficient use of memory, both in terms of added memory usage and added overhead to keep placeholders of data and to ensure that the data are current.

The latency of physical memory locations can change over time. This can be due to various factors. For example, environmental conditions can cause changes in memory latency. Also, usage patterns can change memory latency. For example, when several contiguous memory locations are used computationally in a tight loop, other nearby memory locations might experience an increase in latency due to local traffic on the memory bus servicing the memory locations.

Therefore, there is a need for memory management system that measures memory latency dynamically and that determines the location of where a data unit is stored based on the relative frequency of use of the data unit and the latency of the storage location.

There is also a need for a memory management system that stores data units dynamically in a hierarchical memory space, segregated according to a current value of latency.

SUMMARY OF THE INVENTION

The disadvantages of the prior art are overcome by the present invention which, in one aspect, is a method of controlling computer-readable memory that includes a plurality of memory locations, in which a usage frequency of a data unit stored in a first memory location is determined. The data unit is moved to a second memory location, different from the first memory location that is selected based on a correspondence between a known latency of the second memory location and the usage frequency of the data unit, in which the second memory location is the primary data storage location for the data unit.

In another aspect, the invention is a method of managing a plurality of memory locations that each stores a corresponding data unit used in a computational circuit. A latency is determined for each memory location and a usage frequency determined for each data unit. At least one data unit having a high usage frequency is stored in a primary memory location having a low latency and at least one data unit having a low usage frequency is stored in a primary memory location having a high latency.

In another aspect, the invention is an apparatus for managing data units stored in a plurality of memory locations. Each memory location has a known latency that is classified into one of a plurality of latency classes. A usage frequency indicator is associated with each of the memory locations. An incrementer increments each usage frequency indicator each time a data unit stored in a corresponding memory location is accessed over a predetermined number of cycles. A memory controller stores each data unit in a primary memory location that is a member of a latency class corresponding to a usage frequency of the data unit.

In another aspect, the invention is a method of controlling computer-readable memory that includes a plurality of memory locations, in which a usage frequency of a plurality of data units is determined. Upon each occurrence of a predefined event, a memory latency for each of the plurality of memory locations is determined. After the predefined event, a data unit with a high usage frequency is stored in a memory location with a low latency.

In another aspect, the invention is a system for controlling computer-readable memory that includes a plurality of memory locations. A memory latency determining circuit determines a memory latency for each of a plurality of memory locations upon each occurrence of a predefined event. A usage frequency memory stores a usage frequency of each of a plurality of data units. After the predefined event, a memory scheduler assigns each data unit to a different memory location so that each data unit with a high usage frequency is stored in a memory location with a low latency, based on the memory latency determined after the predefined event.

In yet another aspect, the invention is a memory scheduling system that includes a memory latency detection circuit, a dynamic memory map and a memory scheduler. The memory latency detection circuit detects a latency for each memory location of a plurality of memory locations upon each occurrence of a predefined event. The dynamic memory map maps a plurality of virtual memory locations to a corresponding plurality of physical memory locations. Each physical memory location is assigned to a virtual memory location based on the latency of the physical memory location. The memory scheduler assigns each of a plurality of data units to a different virtual memory location based on a usage frequency of usage of each data unit so that data units with a high usage frequency are assigned to low latency virtual memory locations.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

BRIEF DESCRIPTION OF THE FIGURES OF THE DRAWINGS

FIG. 5 is a flow chart showing a method of dynamic memory assignment.

FIG. 6 is a flow chart showing an event-driven dynamic memory mapping method.

FIG. 7 are tables demonstrating one method of dynamic latency-based memory management.

DETAILED DESCRIPTION OF THE INVENTION

Figure 1:
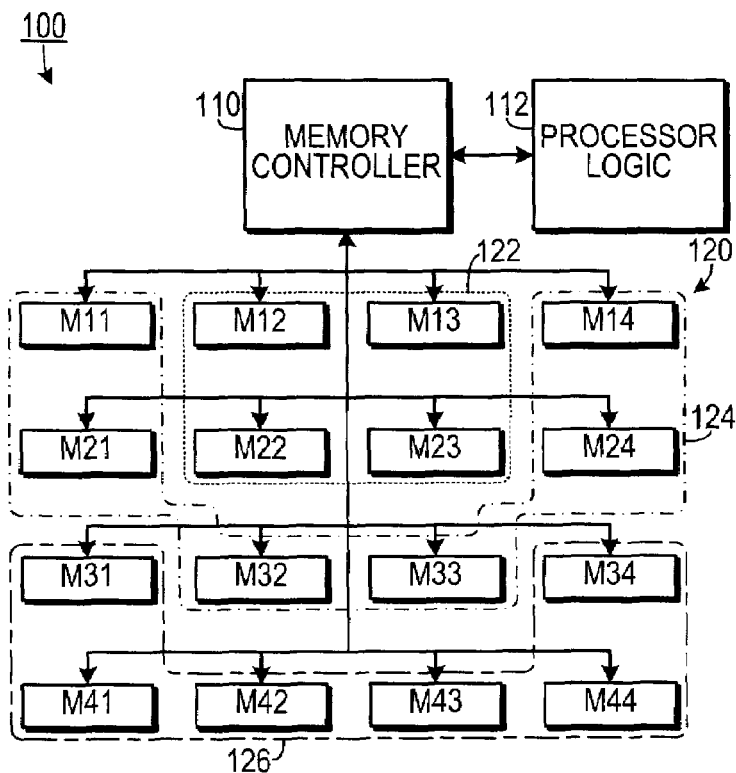
FIG. 1 is a block diagram showing a general memory classification scheme.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Also, as used herein "primary memory location" and "primary location" means a memory location at which a primary copy of a data unit is stored, whereas a "secondary memory location or "secondary location" means a memory location in which a copy of a data unit, already stored in a primary location, is stored. For example, primary locations would typically include main memory, whereas secondary locations would typically cache memory.

In certain applications, it is known that 96-99% of all memory accesses are taken from the same 25% of the memory addresses. A performance enhancement can be achieved by using a memory storage architecture which allows lesser-used data to reside in memory locations that have a relatively high latency (i.e., such as DRAM chips that are farther away from the memory controller), while data units that are more frequently used are stored in lower latency memory locations (i.e., such as in DRAM chips that are nearer to the memory controller). Such an architecture could be applied to many memory standards, including: DRAM, static random access memory (SRAM), FBDIMM memory, buffering and redriving DRAMs, flash memory, or serially-arranged DASD storage devices.

Unlike current cache memory schemes, which store frequently used data units in fast secondary memory locations (such as on board cache chips) and maintain a copy of the original data (or a placeholder) in a primary memory location (such as main memory) of each data unit stored in a secondary location, one embodiment of the present invention differentiates between latencies of primary locations. Thus, the invention treats an entire memory space (or subset thereof) as a group of primary memory locations and moves more frequently accessed data units to the lower latency primary memory locations, while moving less frequently accessed data units to the higher latency primary memory locations.

As shown in FIG. 1, one illustration of a memory management system 100 includes a memory controller 110 that controls data stored in a memory space 120 and that provides data to a processor 112 or other logic circuit. In one embodiment, the memory space 120 could include an array of main memory chips. In another embodiment, the memory space 120 could include several different memory devices, including a combination of: on-chip memory, on-board memory, main memory, etc. The memory space 120 can be grouped in terms of different physical memory units. (The physical units shown are designated M11 through M44, in which the first numeral designates a row and the second numeral designates a column in one way of visualizing the physical units.) The physical units could, for example, correspond to different memory chips, or to different memory locations in a storage device. It should be noted the representation shown in FIG. 1 is greatly simplified to facilitate ease of understanding and that many commercial embodiments could be considerably more complicated. The latency of each memory location is determined either through direct measurement or simulation and each of the individual physical memory locations is grouped into one of a plurality of latency classes according to its latency. For example, memory units M12, M13, M22 and M23 are grouped in a fast latency group 122. This could be, for example, because they are physically close to the memory controller 110 or because they employ a faster technology than the other memory locations, or a combination of the two. A medium latency group 124 includes memory locations M1, M21, M32, M33, M24, and M14. A slow latency group 126 includes memory locations M31, M41, M42, M43, M44 and M34.

The memory controller 110 assigns data units (which could denote anything from individual bytes of data to pages or other groupings) to primary memory locations based on the level of usage of each data unit. Thus, data units that have a relatively high usage frequency would be stored in memory locations in the fast latency group 122, data units that have a relatively moderate usage frequency would be stored in memory locations in the medium latency group 124, and data units that have a relatively low usage frequency would be stored in memory locations in the slow latency group 126.

Figure 2:
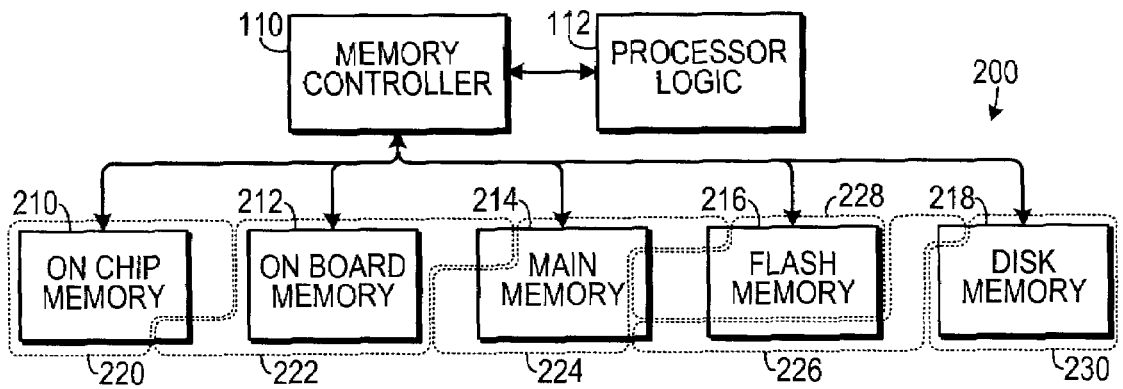
FIG. 2 is a block diagram showing a memory classification scheme employing different types of memory devices.

While in one embodiment, the invention might be applied to improve the performance of only one type of memory, such as main memory, in other embodiments, the invention may be applied to a memory space that crosses over several different memory devices. As shown in FIG. 2, a multi-device memory space 200 could include, inter alia, the following memory devices: on chip memory 210, on board memory 212, main memory 214, flash memory 216 and disk memory 218. It is possible to group the memory locations in as many different latency classes as desired, depending on the application. The example shown includes a fastest group 220 (which includes only on chip memory 210), a next fastest group 222 (which includes a slower portion of the on chip memory 210, all of the on board memory 212 and a low-latency portion of the main memory 214), a medium latency group 224 (which includes most of the memory locations from the main memory 214 and the faster portions of the flash memory 216), a medium slow latency group 228 (which includes slower portions of the main memory 214 and most of the flash memory 228), a slow latency group 226 (which includes the slowest portions of the main memory 214, the slowest portion of the flash memory 216 and the fastest portion of the disk memory 218), and a slowest latency group 230 (which includes most of the disk memory 218). In this scenario, the data units could be classified according to six different usage frequencies and stored in corresponding latency groups.

Figures 3A, 3B, 3C, 3D, 4:
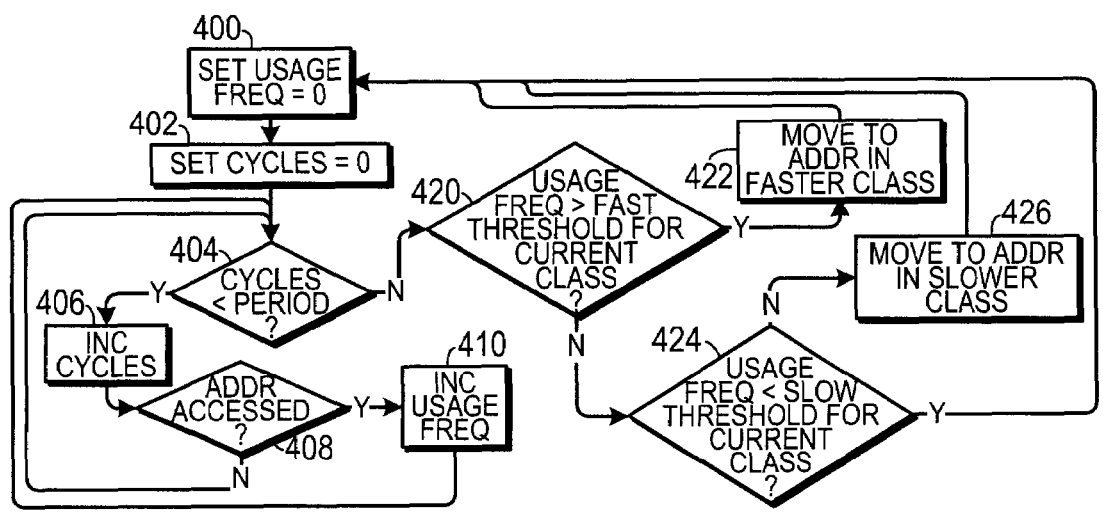
FIGS. 3A-3D are tables illustrating a representative example of latency-based memory management.
FIG. 4 is a flow chart showing a method of memory management.

One scheme that involves the generation of a memory map 300 for managing data according to usage frequency and memory location latency is shown in FIGS. 3A through 3D. In this scheme, all memory addresses are assigned to one of three latency classes: "S" (slow), "M" (medium), or "F" (fast). In one embodiment the memory map 300 could be part of a page table. This assignment would be static in most applications. Initially, as shown in FIG. 3A, each of the data units is assigned a usage frequency of "000." Each data unit can be stored in any memory location. In some embodiments, some or all of the data units may be pre-assigned a memory location based on a prediction of usage frequency. Once memory operations commence, the usage frequency associated with each memory location is incremented each time that the data unit stored therein is accessed. After a predetermined number of cycles, as shown in FIG. 3B, the usage frequency field associated with each memory location reflects the number of times that each data unit has been accessed during the predetermined number of cycles. As shown in FIG. 3C, the least accessed data units are moved to the memory locations designated as "S" (e.g., data unit "EXXXXXX," having not been accessed during the period, is moved from address "0F384," in FIG. 3B, to address "0F380," in FIG. 3C), moderately accessed data units are moved to memory locations designated as "M" (e.g., data unit "AXXXXXX," having been accessed four times during the period, is moved from address "0F380," in FIG. 3B, to address "0F385," in FIG. 3C) and frequently accessed data units are moved to memory locations designated as "F" (e.g., data unit "CXXXXXX," having been accessed seven times during the period, is moved from address "0F382," in FIG. 3B, to address "0F386," in FIG. 3C). Once the data units have been assigned to the proper memory locations, as shown in FIG. 3D, the usage frequency counters are reset to "000" and the process begins again.

A flow diagram of one way to manage memory is shown in FIG. 4. Initially, each usage frequency is set to zero 400 and a memory cycle counter is set to zero 402. A test 404 determines if the predetermined amount of time has ended. If not, the memory cycle counter is incremented 406 and the system determines 408, for each memory address, whether the address was accessed during the current cycle. If the memory was accessed, then the usage frequency corresponding to the address is incremented 410 and the system returns to step 404. If the memory not was accessed, then the system returns directly to step 404. Once the predetermined amount of time has ended, the system determines 420 for each address whether the usage frequency is greater than a "move up" threshold. If it is greater, then the corresponding data unit is moved to an address in a faster latency class. If it is not greater, then the system determines 424 whether the usage frequency is less than a "move down" threshold. If it is less that the move down threshold, then the corresponding data unit is moved to an address in a slower latency class. Otherwise, the data unit is left where it is and the system returns to step 400. The "move up" and "move down" thresholds can be static, based on a predicted number of data units within each usage frequency group, or they can be dynamic, which would allow the frequency usage groups to maintain a constant number of entries, but in which the membership criteria could change.

The invention can be applied to existing memory management schemes and can be applied to existing hardware with little or no modification. For example, an existing scheme employing cache memory, main memory and disk memory can be modified so that the memory location mapping would group existing memory units according to their respective latencies rather than the memory devices upon which they reside. One advantage of the invention over other memory schemes, such as cache memory schemes, is that it does not require the maintenance of duplicate copies of (or placeholders corresponding to) data in both a primary memory location and a secondary memory location.

In one embodiment, the method for determining memory usage would be the same, or similar, as those currently used to page memory between disk and main memory (such as DRAM). It is intended that the scope of the claims below will cover all existing schemes for paging memory in and out of disk memory and other memory types. In one embodiment, the invention can be embodied as an extension of software management of the memory latency map. One way to reduce overhead would be to keep a counter relating to memory pages (rather than individual memory locations), thereby reducing the overhead associated with tracking each accesses.

In some embodiments, a data unit access counter scheme could result in increased overhead. Also, with such a scheme, if a data unit is accessed multiple times over a short period of time and then never accessed again, its access counter would cause it to be left in a low latency memory for too long. Another mechanism for accomplishing data unit assignment could employ a scheme similar to current cache line replacement. Data units that are frequently accessed could be kept in low latency memory through use of a least recently used (LRU) scheme, generally known in the art of memory management system design. In an LRU scheme, data units are ranked on the order of their last access. When it comes time to move a data unit to a slower memory latency class, the data unit that was least recently used is moved first.

The memory latency hierarchy structure may be communicated to the memory management control software, which manages where pages are stored in the memory latency hierarchy. There may be cases where the software tracks memory pages that will always be highly used. In such a case, such memory pages (or other data units) should be pinned to the lowest latency memory locations, such as through a log file for transaction processing that uses locks (e.g., task dispatch locks) for certain data units, thereby ensuring that the data unit is always assigned to memory in a predetermined latency class. It should be noted that the invention may be applied to the entire memory space of a computer, or a just to a subset thereof. It is intended that the scope of the claims will extend to all such scenarios.

In one embodiment, as shown in FIG. 5, the latency of the memory is determined dynamically. This compensates for the fact that memory latency may change during run time due to various factors. In such an embodiment, the system is initialized 510 and the latency of each memory location is determined and mapped into a table 512. Based on the detected memory latencies, the system assigns 514 data units to memory addressed based on data unit usage frequency and memory latency: data units with a high usage frequency are assigned to low latency memory locations and data units with low usage frequency are assigned to relatively high latency memory locations. Upon the occurrence of a predetermined event 516, control returns to the step 512 in which memory latencies are determined.

When measuring the latency of a system at boot time, the memory latencies can be mapped by the firmware to determine the system topology. This map can be used both to map the system initially and in some cases to map the system where addresses have changed physical locations. This is an easier way to keep track of the latencies of the physical locations. The read command-to-data-return is a key statistic for determining latency, so for the real-time measurement, this is a metric that can be used for mapping the latencies.

This embodiment is shown in operation in FIG. 6. During normal system operation 610, the memory scheduling system searches for a predetermined event (or one of several events). The event could be, for example, a chip kill 614, the running of a new software application 616 or the expiration of a period timer 618. In the chip kill scenario, the system detects that a given chip (such as a memory chip) is malfunctioning and moves data to other chips to avoid the malfunction. In the timer scenario, the system periodically tests the latency of the memory space through use of a timer. Once an event occurs, the system determines the latency of each memory location 620 and maps the various data units to the memory space according to the newly-detected latency of each memory location. The system then returns to normal operation 612.

An example of dynamic latency-based memory allocation is shown in FIG. 7, in which a table 700 associates a plurality of virtual memory addresses 714 with a corresponding plurality of latency classes 712. (In the example shown, the latency classes include slow (S), medium (M) and fast (F); however, one of skill in the art would readily understand that fewer or more latency classes could be employed without departing from the scope of the claims below.) After benchmarking the physical memory locations, a memory table 702 associates a plurality of physical memory locations 710 with corresponding latency classes 712. A memory map 704 relates the plurality of virtual memory address 714 to each of the physical memory locations 710 and a memory scheduler assigns the data units 716 to the virtual memory addresses 714 based on the usage frequency of each data unit and the latency class associated with each virtual memory address. (Data unit usage frequency could be determined, for example, through use of a pre-run time analysis routine, or could be determined through such methods as detecting cache hit frequency during run time.) Initially, in the example shown, data units AX . . . X through CX . . . X have been determined to be low usage frequency data units and are assigned to slow latency virtual addresses (00001-00003), data units DX . . . X through FX . . . X have been determined to be medium usage frequency data units and are assigned to medium latency virtual addresses (00004-00006), and data units GX . . . X through JX . . . X have been determined to be high usage frequency data units and are assigned to fast latency virtual addresses (00007-00009).

Upon occurrence of the preselected event, the physical memory locations are retested for latency, resulting in a revised memory table 706 relating the physical addresses 710 to latency classes 718. In the example shown, physical memory location 0F383 had been classified as slow in the original memory table 702, but was reclassified as medium in the revised memory table 706. As can be seen in this example, several other memory locations were also reclassified.

After the event, the physical memory locations 710 are reassociated with virtual memory addresses 714 in a revised memory map 708, and the memory scheduler causes the data units to be written to the physical memory addresses 710 that correspond to the virtual addresses 714 to which they are assigned.

As is readily appreciated by those of skill in the art, there are many different ways to determine the latency of the physical memory locations. In one example, a data timer is started and a first data unit (such as a test data unit) is written to a selected memory location. The data unit is subsequently read from the memory location and when the value read from the memory location is the same as the value written to the memory location, then the timer is stopped and the value stored therein is the memory latency for the memory location. The latency value may be stored in a table relating physical memory locations to latencies, or the latency value can be assigned a latency class, which is written to the table. In another example, a timer is started and a data unit is written to a memory location. The timer is stopped when the signal value being read from the memory location is stable (i.e., its signal value has not changed for a predetermined amount of time).

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A method of controlling computer-readable memory that includes a plurality of memory locations, comprising the actions of:
   a. determining a usage frequency of a plurality of data units;
   b. upon each occurrence of a predefined event, determining a memory latency for each of the plurality of memory locations, wherein the determining memory latency action comprises the actions of:
      i. staffing a data timer;
      ii. storing a first data unit in a selected memory location;
      iii. reading a stored data unit from the selected memory location;
      iv. stopping the data timer when the stored data unit meets a preselected criterion, the data timer holding a memory latency value corresponding to the selected memory location; and
      v. writing the memory latency value into a selected location of a memory table corresponding to the selected memory location; and
   c. after the predefined event, storing a data unit with a high usage frequency in a memory location with a low latency.

2. The method of claim 1, further comprising the action of storing a data unit, with a low usage frequency in a memory location with a high latency.

3. The method of claim 1, wherein the predefined event comprises a chip kill event.

4. The method of claim 1, wherein the predefined event comprises a software change event.

5. The method of claim 1, wherein the predefined event comprises a periodic event.

6. The method of claim 5, further comprising the steps of:
   a. starting a period timer; and
   b. asserting the periodic event when the period timer indicates that a preselected amount of time has passed since the period timer was started.

7. The method of claim 1, wherein the first data unit comprises a test data unit and further comprising the action of determining that the preselected criterion has been met when the stored data unit corresponds to the test data unit.

8. The method of claim 1, further comprising the action of determining that the preselected criterion has been met when the stored data unit has a stable signal value.

9. A system for controlling computer-readable memory that includes a plurality of memory locations, comprising:
   a. a memory latency determining circuit that determines a memory latency for each of a plurality of memory locations upon each occurrence of a predefined event, wherein the memory latency determining circuit comprises:
      i. a data timer;
      ii. a circuit that stores a first data unit in a selected memory location and that staffs the data timer;
      iii. a circuit that reads a stored data unit from the selected memory location;
      iv. a circuit that stops the data timer when the stored data unit meets a preselected criterion, the data timer holding a memory latency value corresponding to the selected memory location; and
      v. a circuit that writes the memory latency value into a selected location of a memory table corresponding to the selected memory location;
   b. a usage frequency memory that stores a usage frequency of each of a plurality of data units; and
   c. a memory scheduler that, after the predefined event, assigns each data unit to a different memory location so that each data unit with a high usage frequency is stored in a memory location with a low latency, based on the memory latency determined after the predefined event.

10. The system of claim 9, wherein the memory scheduler assigns a data unit with a low usage frequency in a memory location with a high latency.

11. The system of claim 9, wherein the predefined event comprises a chip kill event.

12. The system of claim 9, wherein the predefined event comprises a software change event.

13. The system of claim 9, wherein the predefined event comprises a periodic event.

14. The system of claim 13, further comprising:
   a. a period timer; and
   b. a circuit that asserts the periodic event when the period timer indicates that a preselected amount of time has passed since the period timer was started.

15. The system of claim 9 wherein the first data unit comprises a test data unit and further comprising a circuit that determines that the preselected criterion has been met when the stored data unit corresponds to the test data unit.

16. The system of claim 9, further comprising a circuit that determines that the preselected criterion has been met when the stored data unit has a stable signal value.

17. A memory scheduling system, comprising:
   a. a memory latency detection circuit that detects a latency for each memory location of a plurality of memory locations upon each occurrence of a predefined event, wherein the memory latency determining circuit comprises:
      i. a data timer;
      ii. a circuit that stores a first data unit in a selected memory location and that starts the data timer;
      iii. a circuit that reads a stored data unit from the selected memory location;
      iv. a circuit that stops the data timer when the stored data unit meets a preselected criterion, the data timer holding a memory latency value corresponding to the selected memory location; and
      v. a circuit that writes the memory latency value into a selected location of a memory table corresponding to the selected memory location;
   b. a dynamic memory map that maps a plurality of virtual memory locations to a corresponding plurality of physical memory locations, each physical memory location assigned to a virtual memory location based on the latency of the physical memory location; and
   c. a memory scheduler that assigns each of a plurality of data units to a different virtual memory location based on a usage frequency of usage of each data unit, so that data units with a high usage frequency are assigned to low latency virtual memory locations.

18. The memory scheduling system of claim 17, wherein the memory latency detection circuit comprises a circuit that is configured to measure an amount of time between when a data unit is written to a data location and when the data unit is valid on the memory location.

* * * * *